US012317050B2

(12) United States Patent
Yang et al.

(10) Patent No.: US 12,317,050 B2
(45) Date of Patent: May 27, 2025

(54) SPEAKER MODULE

(71) Applicants: AAC ACOUSTIC TECHNOLOGIES (SHENZHEN) CO., LTD., Shenzhen (CN); AAC Microtech (Changzhou) Co., Ltd., Changzhou (CN)

(72) Inventors: Haijuan Yang, Shenzhen (CN); Lei Wang, Shenzhen (CN); Shuwen Wu, Shenzhen (CN)

(73) Assignees: AAC ACOUSTIC TECHNOLOGIES (SHENZHEN) CO., LTD., Shenzhen (CN); AAC Microtech (Changzhou) Co., Ltd., Changzhou (CN)

( * ) Notice: Subject to any disclaimer, the term of this patent is extended or adjusted under 35 U.S.C. 154(b) by 233 days.

(21) Appl. No.: 18/094,993

(22) Filed: Jan. 10, 2023

(65) Prior Publication Data

US 2023/0328453 A1 Oct. 12, 2023

Related U.S. Application Data

(63) Continuation of application No. PCT/CN2022/090941, filed on May 5, 2022.

(30) Foreign Application Priority Data

Apr. 7, 2022 (CN) ......................... 202210361277.1

(51) Int. Cl.

| | |
|---|---|
| ***H04R 9/06*** | (2006.01) |
| ***H04R 7/20*** | (2006.01) |
| ***H04R 9/02*** | (2006.01) |
| ***H04R 9/04*** | (2006.01) |

(52) U.S. Cl.
CPC ................. *H04R 9/06* (2013.01); *H04R 7/20* (2013.01); *H04R 9/025* (2013.01); *H04R 9/045* (2013.01)

(58) Field of Classification Search
CPC . H04R 9/06; H04R 7/20; H04R 9/025; H04R 9/045; H04R 2400/11; H04R 2420/09; H04R 31/006; H04R 1/023; H04R 1/288; H04R 7/127; H04R 9/063; H04R 1/02; H04R 2400/03; H04R 1/021; H04R 7/04; H04R 2499/11; H04R 1/00; H05K 1/189; H02K 33/16; H02K 35/02; H02K 1/34
See application file for complete search history.

(56) References Cited

U.S. PATENT DOCUMENTS

| | | | | |
|---|---|---|---|---|
| 11,277,693 B1 * | 3/2022 | He | ......................... | H04R 1/025 |
| 2015/0063607 A1 * | 3/2015 | Li | ......................... | H04R 1/00 381/162 |

* cited by examiner

*Primary Examiner* — Angelica M McKinney
(74) *Attorney, Agent, or Firm* — Wiersch Law Group

(57) ABSTRACT

The present disclosure provides a speaker module. The speaker module includes a housing body, a vibration system, and a magnetic circuit system. The housing body includes a support frame having a through cavity, a front cover mounted on the through cavity opening side of the support frame, and a back cover mounted on the side of the support frame away from the front cover. The vibration system, the support frame and the back cover are enclosed to form a back cavity. The support frame includes an integrally injection-molded conductive element. This configuration of the present disclosure can simplify the manufacturing process of the speaker module, and reduce the application cost.

12 Claims, 4 Drawing Sheets

B-B

B-B

SPEAKER MODULE

FIELD OF THE PRESENT DISCLOSURE

The present disclosure relates to the field of electro-acoustic transducers, and in particular relates to a speaker module.

DESCRIPTION OF RELATED ART

In audio equipment, speaker module is a commonly used electronic device, mainly used for audio signal playback. In the related art, the speaker module usually includes a housing body and a speaker unit accommodated in the housing body. Meanwhile, the speaker unit uses a flexible circuit board to lead out the housing body so as to be connected to the external circuit. However, in the assembly process, the speaker module in the aforementioned setting method needs to be assembled first to form a speaker unit, and then the speaker unit must be assembled into the housing body to form a speaker module. In addition, there are many manufacturing processes of the flexible circuit board, which leads to many assembly processes and high cost of the speaker module of the related art.

SUMMARY OF THE PRESENT DISCLOSURE

The purpose of the present disclosure is to provide a speaker module, which can simplify the manufacturing process and assembly process of the speaker module and reduce the application cost.

For achieving the object mentioned above, the present disclosure provides a speaker module, including: a housing body with a containment space, including a support frame having a through cavity, a front cover mounted with a side having the through cavity of the support frame, and a back cover mounted on a side of the support frame away from the front cover; a vibration system contained in the containment space; a magnetic circuit system contained in the containment space for driving the vibration system to vibrate; a positioning structure formed by an inner side of the support frame, having a side close to the front cover for fixing the vibration system and another side close to the back cover for supporting the magnetic circuit system; a front cavity formed between the vibration system and the front cover; and a back cavity formed by the vibration system, the support frame and the back cover.

The support frame includes a conductive element integrally injection-molded therein; the conductive element is exposed to the through cavity and exposed outside the support frame for being electrically connected to the vibration system.

In addition, the conductive element includes a connection sheet embedded in the support frame, an inner contact sheet bent and extended from a side of the connection sheet close to the through cavity to one side, and an outer contact sheet that is bent to one side from the side of the connection sheet away from the through cavity; the inner contact sheet is at least partially exposed to the through cavity; the outer contact sheet is at least partially exposed to the outside of the support frame.

In addition, the inner contact sheet extends along the inner side surface of the support frame; the inner contact sheet is at least partially embedded in the support frame; the outer contact sheet extends along the outer side surface of the support frame, and the outer contact sheet is at least partially embedded in the support frame.

In addition, a positioning loophole is opened in an edge of the outer contact sheet; and the support frame is embedded in the positioning loophole; and/or, the outer contact sheet has a positioning hole with a thickness direction passing through, and at least part of the support frame is embedded in the positioning hole.

In addition, the speaker module further includes a pin fixed to the outside of the support frame and electrically connected to the conductive element; wherein the pin protrudes from the outer surface of the support frame.

In addition, the pin includes a fixed sheet attached to the outer side of the support frame and an elastic connection leg having one end connected to the fixed sheet; the other end of the elastic connection leg is bent and extended toward the side of the fixed sheet away from the support frame.

In addition, the pin further includes a buckling part connected to the fixed sheet and bent and extended toward the side of the fixed sheet facing away from the support frame. The buckling part has a position limiting hole; the free end of the elastic connection leg is movably connected in the position limiting hole.

In addition, the support frame forms an avoidance groove by recessing in a part thereof corresponding to the buckling part; a projection of the position limiting hole in the thickness direction of the fixed sheet falls into the avoidance groove.

In addition, an outer side of the support frame is recessed inward to form a mounting groove; the conductive element is embedded in the groove wall of the mounting groove; the pin is accommodated in the mounting groove.

In addition, a middle part of the elastic connection leg is bent in a direction away from the fixed sheet to form a contact point part; the contact point part protrudes beyond the groove opening of the mounting groove.

In addition, the vibration system includes a first diaphragm; a dome connected to an inner edge of the first diaphragm; a voice coil fixed on a side of the dome close to the magnetic circuit system; a flexible circuit board with one end connected to a side of the voice coil far from the dome and another end connected to a side of the positioning structure close to the front cover; and a second diaphragm with one end clamped and fixed between the flexible circuit board and the positioning structure, and another end connected to the positioning structure. The flexible circuit board is electrically connected to a side of the conductive element close to the through cavity.

Further, the housing body further includes a clamping board integrally connected to the support frame on one side and extending toward the through cavity on the other side. The magnetic circuit system includes a yoke fixed on a side of the positioning structure close to the back cover, a center magnet fixed to a side of the yoke near the dome, a side magnet clamped and fixed between the yoke and the clamping board, a pole core is fixed to the side of the center magnet away from the yoke, and a magnetic gap formed between the center magnet and the side magnet.

Further, the yoke has a venthole; the magnetic circuit system further includes an air-permeable mesh attached to the yoke and covering the venthole; the yoke, the air-permeable net, the support frame and the back cover are enclosed to form a filling space; the back cover has a filling hole that communicates with the filling space, and the housing body further includes a sealing element that is sealed and connected to the filling hole.

The conductive element is integrally injected into the support frame. During the process of assembling the speaker module, the vibration system and the magnetic circuit system are directly installed on the opposite sides of the positioning structure.

After assembly, the vibration system is electrically connected to the inner side of the conductive element, thereby forming a speaker core accommodated in the through cavity. Afterwards, the front cover and the back cover are assembled on both sides of the support frame to form a speaker module. The speaker module can be electrically connected to the external circuit through the exposed side of the conductive element outside the support frame. In this solution, the assembly process of assembling to form the speaker unit is not required.

And, the vibration system can realize the contact-type electrical connection with the external circuit through the conductive element in the support frame. The speaker module is simplified, and the application is more convenient and quicker, and the application cost is lower.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

Figure 1:
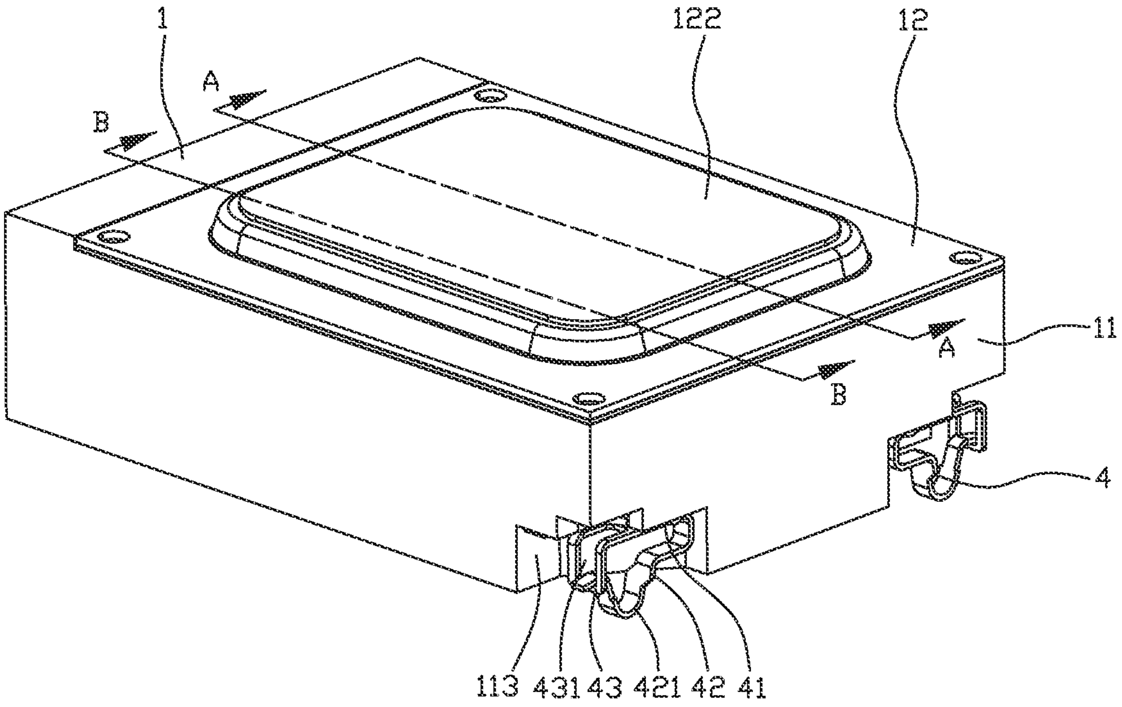
FIG. 1 is an isometric view of a speaker module in accordance with an embodiment of the present disclosure.
Figure 2:
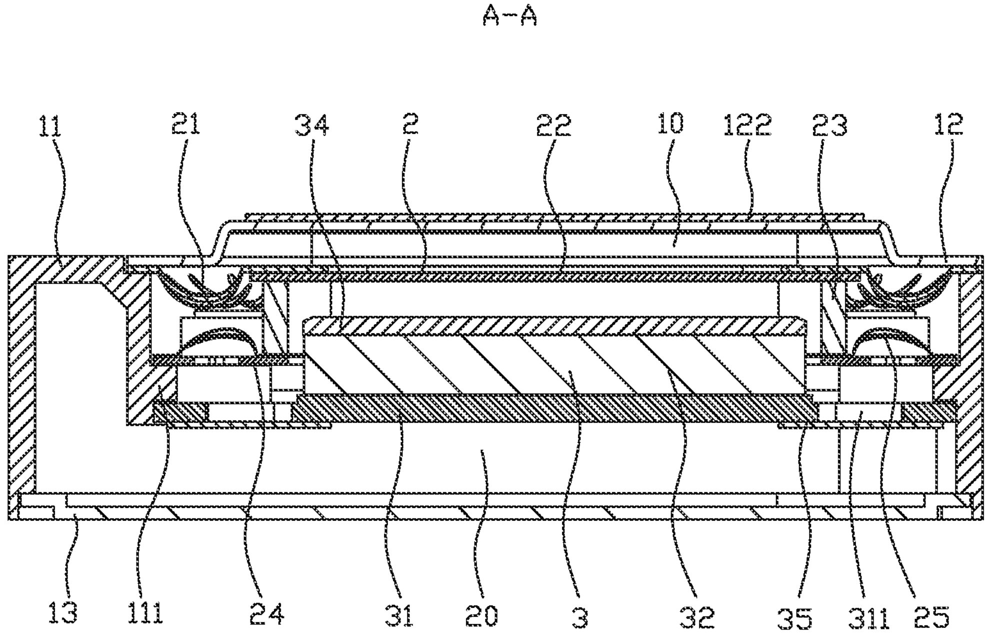
FIG. 2 is a cross-sectional view of the speaker module taken along line AA in FIG. 1.

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Refer to FIGS. 1-5, a speaker module is provided. The speaker module includes a housing body 1 with a containment space, a vibration system 2 contained in the containment space, and a magnetic circuit system 3 contained in the containment space to drive the vibration system 2 to vibrate and generate sound. The housing body 1 includes a support frame 11 having a through cavity, a front cover 12 mounted on the opening side of the through cavity of the support frame 11. The back cover 13 installed on the side of the support frame 11 away from the front cover 12. The support frame 11 is provided with a positioning structure 111. The vibration system 2 is fixed to the side of the positioning structure 111 close to the front cover 12. The magnetic circuit system 3 is fixed to the side of the positioning structure 111 close to the back cover 13.

A front cavity 10 is formed between the vibration system 2 and the front cover 12. The vibration system 2, the support frame 11 and the back cover 13 are enclosed to form a back cavity 20. The support frame 11 includes a conductive element 112 integrally injection-molded therein. The conductive element 112 is exposed to the through cavity and is electrically connected to the vibration system 2. The conductive element 112 is exposed outside the support frame 11.

The conductive element 112 is integrally molded into the support frame 11. In the process of assembling the speaker module, the vibration system 2 and the magnetic circuit system 3 are directly installed on opposite sides of the positioning structure 111. After assembly, the vibration system 2 is electrically connected to the inner side of the conductive element 112, thereby forming a speaker core accommodated in the through cavity. Then, the front cover 12 and the back cover 13 are assembled on both sides of the support frame 11 to form a speaker module. The speaker module can be electrically connected to the external circuit through the exposed side of the conductive element 112 outside the support frame 11.

In this solution, the assembly process of assembling to form the speaker unit is not required. Moreover, the vibration system 2 can realize the contact-type electrical connection with the external circuit through the conductive element 112 in the support frame 11. The speaker module are simplified, and the application is more convenient and quicker, and the application cost is lower.

Figure 3:
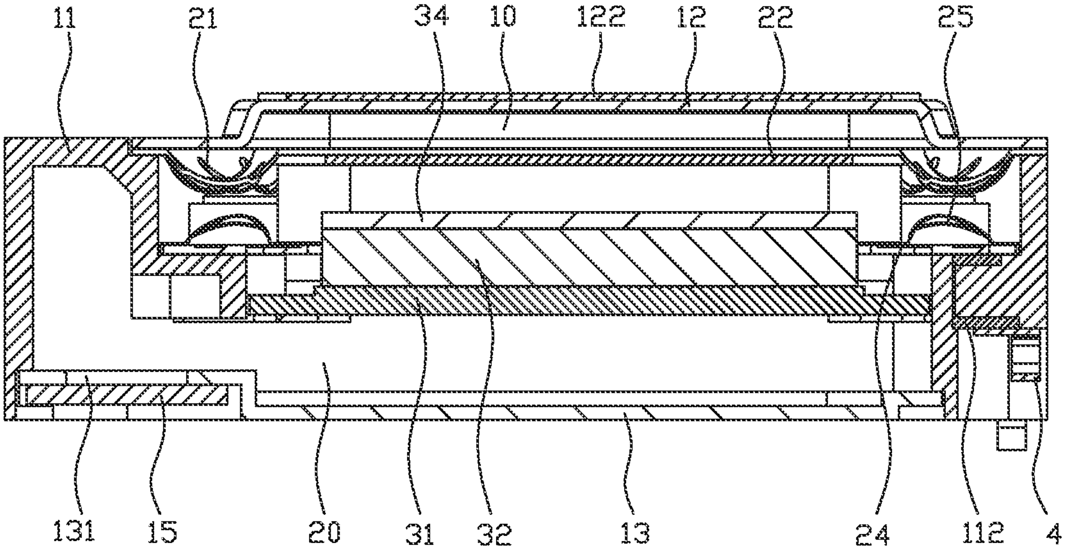
FIG. 3 is a cross-sectional view of the speaker module taken along line BB in FIG. 1.
Figure 4:
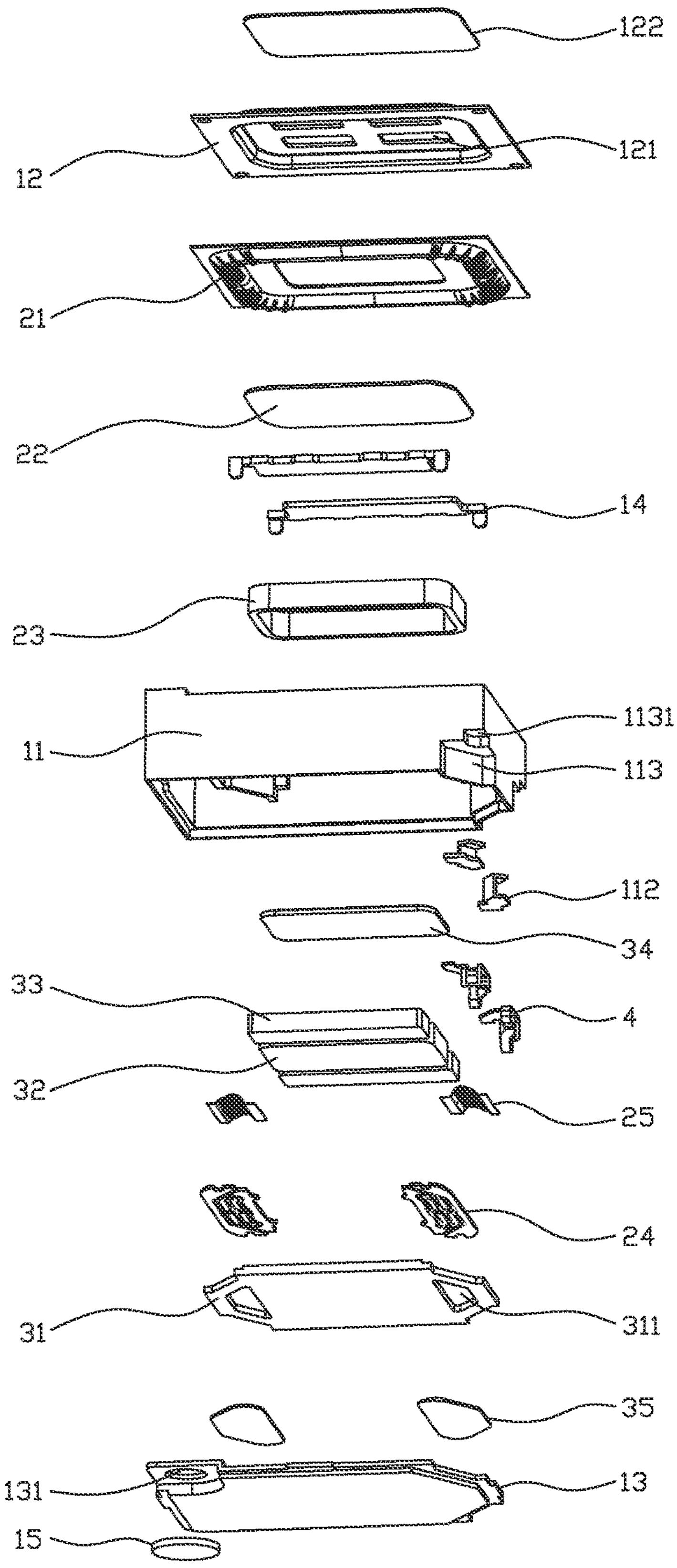
FIG. 4 is an isometric and exploded view of the speaker module.
Figure 5:
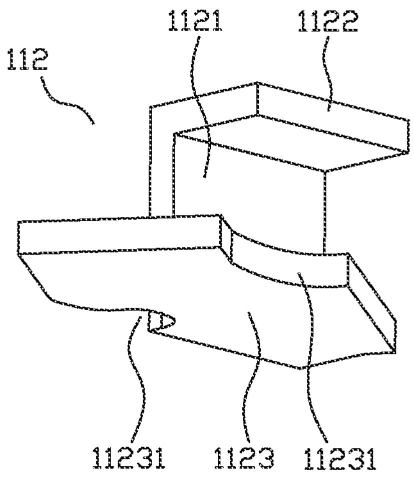
FIG. 5 is an isometric view of a conductive element of the speaker module.

Refer to FIGS. 3-5, the conductive element 112 includes a connection sheet 1121 embedded in the support frame 11, an inner contact sheet 1122, bent and extended from the side of the connection sheet 1121 close to the through cavity to one side, and an outer contact sheet 1123 which is bent and extended from the side of the connection sheet 1121 away from the through cavity to one side. The inner contact sheet 1122 is at least partially exposed to the through cavity and the outer contact sheet 1123 is at least partially exposed to the outside of the support frame 11.

The inner contact sheet 1122 extends along the inner side surface of the support frame 11, and the inner contact sheet 1122 is at least partially embedded in the support frame 11. The outer contact sheet 1123 extends along the outer side surface of the support frame 11, and the outer contact sheet 1123 is at least partially embedded in the support frame 11.

Specifically, in this embodiment, the inner side surface of the inner contact sheet 1122 is flush with the inner side surface of the corresponding position of the support frame 11. The side surface of the outer contact sheet 1123 is flush with the outer side surface of the corresponding position of the support frame 11. This can make the integrity between the connection sheet 1121 and the support frame 11 better. The support frame 11 is made flatter on both the inner side and the outer side surface, so as to ensure a smoother and more reliable assembly process.

In order to improve the connection stability between the conductive element 112 and the support frame 11, a positioning loophole 11231 is opened at the edge of the outer contact sheet 1123. The support frame 11 is embedded within the positioning loophole 11231. Specifically, in this embodiment, the edges of opposite sides of the outer contact sheet 1123 are respectively provided with c-type openings. outer contact sheet 1123 is larger than that of the inner contact sheet 1122. And the projection of the inner contact sheet 1122 in the vibration direction of the vibration system 2 falls within the projection of the outer contact sheet 1123 in this direction. The support frame 11 is formed by injection molding of plastic material. During the injection molding process, the conductive element 112 is embedded in the support frame 11, and the plastic material flows into the c-type opening, thereby limiting the outer contact sheet 1123. In this way, the connection between the conductive element 112 and the support frame 11 is more reliable and stable. Since the conductive element 112 is directly molded into the support frame 11 by injection molding, there is no need to set up additional FPC to connect with the internal vibration system 2. Therefore, the manufacturing difficulty can be reduced, and the gap of the speaker module after the assembly is completed can be reduced, and the sealing performance can be improved.

In some embodiments, the outer contact sheet 1123 may also be provided with a positioning hole passing through the thickness direction. The support frame 11 is embedded in the positioning hole. The connection tightness between the conductive element 112 and the support frame 11 is further improved.

In this embodiment, two conductive elements 112 are symmetrically arranged on the support frame 11. Two conductive elements 112 are respectively set at two corner positions of the support frame 11, preferably two corner positions where the same side surface is located.

Refer to FIGS. 1, 3, and 5, the pin 4 includes a fixed sheet 41 attached to the outside of the support frame 11 and an elastic connection leg 42 connected to the fixed sheet 41 at one end. The elastic connection leg 42 is bent and extended toward the side of the fixed sheet 41 facing away from the support frame 11. When the assembled speaker module is connected to the external circuit, it is just needed to align the corresponding contacts of the elastic connection leg 42 and the external circuit and press them tightly. Then the electrical connection with the external circuit can be realized, which is convenient and quick, and the application cost is low. In some embodiments, pin 4 can also be set on the external circuit, that is, when the speaker module is connected to the external circuit, it is only necessary to press pin 4 of the external circuit and the outer contact sheet 1123 of the conductive element 112 to make electrical connection.

In this embodiment, the pin 4 further includes a buckling part 43 connected to the fixed sheet 41 and is bent and extended toward the side of the fixed sheet 41 away from the support frame 11. The buckling part 43 has a position limiting hole 431, and the free end of the elastic connection leg 42 is movably connected in the position limiting hole 431. Specifically, the connection between the buckling part 43 and the fixed sheet 41 is located on the opposite side of the connection between the elastic connection leg 42 and the fixed sheet 41. Since the free end of the elastic connection leg 42 is movably connected in the position limiting hole 431, the position limiting hole 431 can limit the position of the elastic connection leg 42. The elastic connection leg 42 can move within a predetermined range.

A avoidance groove 1131 is formed in a recessed portion corresponding to the buckling part 43 of the support frame 11. A projection of the position limiting hole 431 in the thickness direction of the fixed sheet 41 falls into the avoidance groove 1131.

The avoidance groove 1131 can accommodate the end part of the elastic connection leg 42 when the elastic connection leg 42 is elastically deformed. Therefore, the elastic connection leg 42 has a larger deformation range, and is suitable for a wider range when assembled with the external circuit.

In order to improve the integrity of the assembled product of the speaker module, facilitate transportation, and facilitate the contact connection between the speaker module and the external circuit. The support frame 11 is recessed inward to form a mounting groove 113. The conductive element 112 is embedded in the groove wall of the mounting groove 113. Pin 4 is accommodated in mounting groove 113. Specifically, in this embodiment, two corner positions on the same side of the support frame 11 are recessed to form a mounting groove 113 respectively. The two mounting grooves 113 are distributed symmetrically. The groove bottom of the mounting groove 113 is provided with an avoidance groove 1131. The outer contact sheet 1123 is embedded in the groove bottom of the mounting groove 113.

Also, the outer surface of the outer contact sheet 1123 is flush with the groove bottom surface of the mounting groove 113. The fixed sheet 41 is fixed to the groove bottom of the mounting groove 113. The fixed sheet 41 can be electrically connected to the outer contact sheet 1123 by welding or screwing. The middle part of the elastic connection leg 42 is bent away from the fixed sheet 41 to form a contact point part 421. The contact point part 421 protrudes beyond the groove opening of the mounting groove 113. When assembling the speaker module with the external circuit, it is just needed to point the contact point part 421 towards the external circuit, then let the contact point part 421 and the contact point of the external circuit tightly touch to realize the electrical connection.

And after the electrical connection, one side of the support frame 11 can be closely attached to the product assembly surface. The pin 4 can be completely accommodated in the mounting groove 113, saving more space. Further, a gap is formed between the groove bottom of the mounting groove 113 and the vibration system 2. This interval becomes part of the back cavity 20, thereby increasing the volume of the back cavity 20 to improve vocal performance of the speaker.

The vibration system 2 includes a first diaphragm 21, the outer edge of which is connected to the side of the support frame 11 close to the front cover 12;

a dome 22 connected to the inner edge of first diaphragm 21, a voice coil 23 fixed on the side of the dome 22 close to the magnetic circuit system 3; a flexible circuit board 24, one end of which is connected to the side of the voice coil 23 away from the dome 22 and the other end is connected to the side of the positioning structure 111 close to the front cover 12; and a second diaphragm 25, one end of which is clamped and fixed between the flexible circuit board 24 and the positioning structure 111 and the other end is connected to the positioning structure 111. The flexible circuit board 24 is electrically connected to the side of the conductive element 112 near the through cavity.

Specifically, the outer edge of the first diaphragm 21 is closely connected to one side of the support frame 11. The front cover 12 is arranged on the side of the first diaphragm 21 facing away from the support frame 11 and is fixed to the support frame 11. The first diaphragm 21 is clamped between the front cover 12 and the support frame 11. The front cover 12 and first diaphragm 21 enclose a front cavity 10. The front cover 12 is provided with a sound output hole 121 connected with the front cavity 10. A dust filter 122 is provided on the side of the front cover 12 facing away from the support frame 11. The dust filter 122 covers the sound output hole 121. The flexible circuit board 24 and the second diaphragm 25 are arranged symmetrically to ensure the vibration stability of the vibration system 2.

One of the flexible circuit boards 24 corresponds to the mounting groove 113 in position. One side of the flexible circuit board 24 is electrically connected to the voice coil 23. The other side of the flexible circuit board 24 is attached to the positioning structure 111. Specifically, it is attached to the inner side of the groove bottom of the mounting groove 113, that is, the groove bottom of the mounting groove 113 is a part of the positioning structure 111. In addition, the inner contact sheet 1122 is located in the groove bottom of the mounting groove 113 and one side is flatly aligned with the inner side of the groove bottom. Therefore, the flexible circuit board 24 can be electrically connected to the inner contact sheet 1122.

The housing body 1 also includes a clamping board 14 with one side integrally injection-molded into the support frame 11 and the other side extending toward the through cavity. The magnetic circuit system 3 includes a yoke 31 fixed on the side of the positioning structure 111 close to the back cover 13, a center magnet 32 fixed on the side of the yoke 31 close to the dome 22, a side magnet 33 fixed between the yoke 31 and the clamping board 14, and a pole core 34 fixed on the side of the center magnet 32 away from the yoke 31.

A magnetic gap is formed between the center magnet 32 and the side magnet 33. The voice coil 23 is accommodated in the magnetic gap. Specifically, in this embodiment, the magnetic circuit system 3 includes two clamping boards 14 arranged symmetrically, one side of the clamping board 14 is provided with a protruding limit protrusion and a fitting protrusion extending in a direction perpendicular to its board surface. Both the limit protraction fitting and the protraction are integrally molded into the support frame 11, so as to ensure the connection stability between the clamping board 14 and the support frame 11. Under the joint action of the clamping board 14 and the yoke 31, both the center magnet 32 and the side magnet 33 can be stably connected to the support frame 11.

The yoke 31 is provided a venthole 311, and the magnetic circuit system 3 further includes an air-permeable mesh 35, a yoke 31, and an air-permeable mesh 35 attached to the yoke 31 and covering the venthole 311. The support frame 11 and the back cover 13 are enclosed to form a filling space. The back cover 13 is provided a filling hole 131 that connects with the filling space. The housing body 1 also includes a sealing element 15 hermetically connected to the filling hole 131.

Specifically, the yoke 31 is provided with two symmetrical ventholes 311, and the two ventholes 311 correspond to the positions of the two flexible circuit boards 24 respectively. And each venthole 311 covers a air-permeable mesh 35, that is, the back cavity 20 is divided into two sub-cavities by the yoke 31 and the air-permeable mesh 35. One of the sub-cavities is the filling space. After the speaker module is assembled, the filling space can be filled with sound absorbing material through the filling hole 131. The air-permeable mesh can prevent the sound absorbing material from entering the magnetic circuit system 3, and the filling space can be sealed with the sealing element 15 after filling. By filling the sound absorbing material, the sound performance of the speaker module can be improved.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A speaker module, including:

a housing body with a containment space, including a support frame having a through cavity, a front cover mounted with a side having the through cavity of the support frame, and a back cover mounted on a side of the support frame away from the front cover;

a vibration system contained in the containment space;

a magnetic circuit system contained in the containment space for driving the vibration system to vibrate;

a positioning structure formed by an inner side of the support frame, having a side close to the front cover for fixing the vibration system and another side close to the back cover for supporting the magnetic circuit system;

a front cavity formed between the vibration system and the front cover;

a back cavity formed by the vibration system, the support frame and the back cover; wherein the support frame includes a conductive element integrally injection-molded therein; the conductive element is exposed to the through cavity and exposed outside the support frame for being electrically connected to the vibration system;

further including a pin fixed to the outside of the support frame and electrically connected to the conductive element; wherein the pin protrudes from the outer surface of the support frame.

2. The speaker module as described in claim 1, wherein the conductive element includes a connection sheet embedded in the support frame, an inner contact sheet bent and extended from a side of the connection sheet close to the through cavity to one side, and an outer contact sheet that is bent to one side from the side of the connection sheet away from the through cavity; the inner contact sheet is at least partially exposed to the through cavity; the outer contact sheet is at least partially exposed to the outside of the support frame.

3. The speaker module as described in claim 2, wherein the inner contact sheet extends along the inner side surface of the support frame; the inner contact sheet is at least partially embedded in the support frame; the outer contact sheet extends along the outer side surface of the support frame, and the outer contact sheet is at least partially embedded in the support frame.

4. The speaker module as described in claim 2, wherein a positioning loophole is opened in an edge of the outer contact sheet; and at least a part of the support frame is embedded in the positioning loophole; and/or, the outer contact sheet has a positioning hole with a thickness direction passing through, and at least part of the support frame is embedded in the positioning hole.

5. The speaker module as described in claim 1, wherein the pin includes a fixed sheet attached to the outer side of the support frame and an elastic connection leg having one end connected to the fixed sheet; the other end of the elastic connection leg is bent and extended toward the side of the fixed sheet away from the support frame.

6. The speaker module as described in claim 5, wherein the pin further includes a buckling part connected to the fixed sheet and bent and extended toward the side of the fixed sheet facing away from the support frame; the buckling part has a position limiting hole; the free end of the elastic connection leg is movably connected in the position limiting hole.

7. The speaker module as described in claim 6, wherein the support frame recesses for forming an avoidance groove in a portion thereof corresponding to the buckling par; a projection of the position limiting hole in the thickness direction of the fixed sheet falls into the avoidance groove.

8. The speaker module as described in claim 6, wherein an outer side of the support frame is recessed inward to form a mounting groove; the conductive element is embedded in the groove wall of the mounting groove; the pin is accommodated in the mounting groove.

9. The speaker module as described in claim 8, wherein a middle part of the elastic connection leg is bent in a direction away from the fixed sheet to form a contact point part; the contact point part protrudes beyond the groove opening of the mounting groove.

10. The speaker module as described in claim 1, wherein the vibration system includes:

a first diaphragm;

a dome connected to an inner edge of the first diaphragm;

a voice coil fixed on a side of the dome close to the magnetic circuit system;

a flexible circuit board with one end connected to a side of the voice coil far from the dome and another end connected to a side of the positioning structure close to the front cover;

a second diaphragm with one end clamped and fixed between the flexible circuit board and the positioning structure, and another end connected to the positioning structure; and wherein the flexible circuit board is electrically connected to a side of the conductive element close to the through cavity.

11. The speaker module as described in claim 10, wherein the housing body further includes a clamping board integrally connected to the support frame on one side and extending toward the through cavity on the other side;

the magnetic circuit system includes a yoke fixed on a side of the positioning structure close to the back cover, a center magnet fixed to a side of the yoke near the dome, a side magnet clamped and fixed between the yoke and the clamping board, a pole core is fixed to the side of the center magnet away from the yoke, and a magnetic gap formed between the center magnet and the side magnet.

12. The speaker module as described in claim 11, wherein the yoke has a venthole; the magnetic circuit system further includes an air-permeable mesh attached to the yoke and covering the venthole; the yoke, the air-permeable net, the support frame and the back cover are enclosed to form a filling space; the back cover has a filling hole that communicates with the filling space, and the housing body further includes a sealing element that is sealed and connected to the filling hole.

* * * * *